United States Patent
Stephen

(10) Patent No.: US 6,880,788 B2
(45) Date of Patent: Apr. 19, 2005

(54) RING-POST FASTENER

(75) Inventor: Robert Stephen, Pomona, CA (US)

(73) Assignee: NMC Group, Inc., Pomona, CA (US)

( * ) Notice: Subject to any disclaimer, the term of this patent is extended or adjusted under 35 U.S.C. 154(b) by 0 days.

(21) Appl. No.: 10/456,426

(22) Filed: Jun. 5, 2003

(65) Prior Publication Data

US 2004/0037667 A1 Feb. 26, 2004

Related U.S. Application Data

(60) Provisional application No. 60/400,637, filed on Jul. 31, 2002.

(51) Int. Cl.$^7$ ............................................. F16L 3/22
(52) U.S. Cl. ...................... 248/68.1; 248/74.3; 248/69; 248/73; 248/71; 24/130; 24/127; 411/383; 411/389; 174/53
(58) Field of Search .................................. 411/401, 383, 411/384, 389, 178; 439/719, 471; 174/53, 54, 61, 62; 24/130; 248/74.3, 69, 73, 71, 49, 68.1, 74.4, 53; 211/85.5, 85.17

(56) References Cited

U.S. PATENT DOCUMENTS

| | | | | |
|---|---|---|---|---|
| 321,624 A | * | 7/1885 | McPherson | 211/67 |
| 446,871 A | * | 2/1891 | Lieb | 439/736 |
| 923,705 A | * | 6/1909 | Reyher | 211/163 |
| 2,034,573 A | * | 3/1936 | Goehring | 137/625.3 |
| 2,935,553 A | * | 5/1960 | Showman | 174/157 |
| 2,941,669 A | * | 6/1960 | Palay et al. | 211/1.55 |
| 3,250,505 A | * | 5/1966 | Rodman, Sr. et al. | 248/49 |
| 3,286,419 A | * | 11/1966 | Eriksson | 52/223.13 |
| 3,348,347 A | * | 10/1967 | Berry | 52/309.1 |
| 3,424,317 A | * | 1/1969 | Singer | 211/167 |
| 3,563,131 A | * | 2/1971 | Ridley, Sr. | 411/384 |
| 3,694,989 A | * | 10/1972 | Oliver et al. | 52/678 |
| 3,778,956 A | * | 12/1973 | Martin | 52/584.1 |
| 3,874,512 A | * | 4/1975 | Wegley et al. | 211/163 |
| 4,177,359 A | * | 12/1979 | Naranjo | 248/49 |
| 4,337,934 A | * | 7/1982 | Caveney | 269/77 |
| 4,534,471 A | * | 8/1985 | Zahn et al. | 211/39 |
| 4,655,023 A | * | 4/1987 | Yung | 52/685 |
| 4,715,571 A | * | 12/1987 | Soltow et al. | 248/68.1 |
| 4,763,855 A | * | 8/1988 | DiVincenzo | 242/139 |
| 5,052,563 A | * | 10/1991 | Camp | 211/85.2 |
| 5,054,624 A | * | 10/1991 | Camp | 211/85.2 |
| 5,337,934 A | * | 8/1994 | Johnson et al. | 224/153 |
| 5,347,787 A | * | 9/1994 | Gavin | 52/677 |
| 5,462,178 A | * | 10/1995 | Wallach et al. | 211/95 |
| 5,772,050 A | * | 6/1998 | Shih | 211/39 |
| 5,984,114 A | * | 11/1999 | Frankel | 211/34 |
| 6,035,898 A | * | 3/2000 | Dominguez | 138/89 |
| 6,086,171 A | * | 7/2000 | Ashley et al. | 312/97.1 |

FOREIGN PATENT DOCUMENTS

EP 0602548 A1 * 6/1994

* cited by examiner

Primary Examiner—Kimberly Wood
(74) Attorney, Agent, or Firm—Drummond & Duckworth

(57) ABSTRACT

A one-piece construction ring-post fastener is provided for bundling and securing elongate objects such as electrical wires, tubes or hoses. The ring-post fastener includes an axially aligned post, a plurality of spokes radially projecting from the post, and a ring affixed to the ends of the spokes. The ring-post fastener further includes constructions for affixing the post to the support surface, such as male threads of a threaded fastener projecting from one end of the post. Preferably, the end opposite the male threads include female threads of a threaded fastener sized and configured for receipt of the male threads located at the opposite end of the post. Attaching the male and female threads of the threaded fasteners together enables the multiple ring-post fasteners to be stacked upon themselves. Preferably, the one-piece ring post is constructed of a plastic material, such as Nylon 6/6 per ASTM D4066.

14 Claims, 4 Drawing Sheets

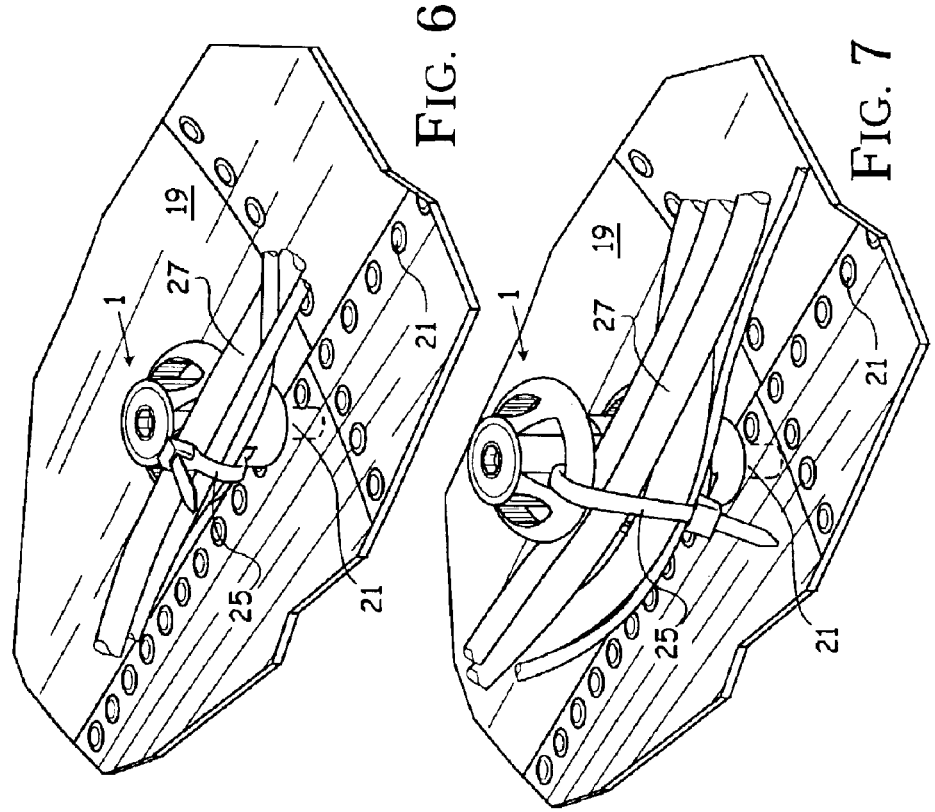
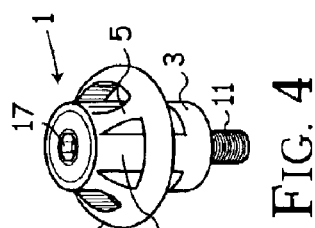
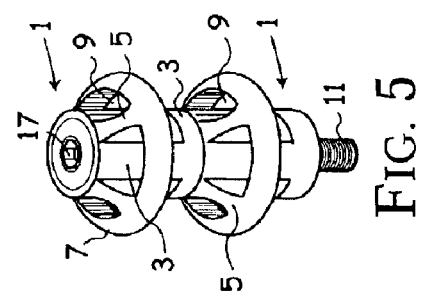
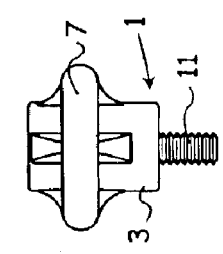
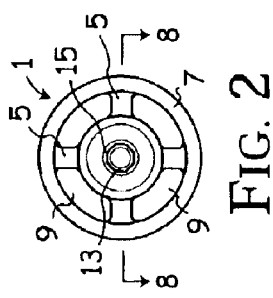
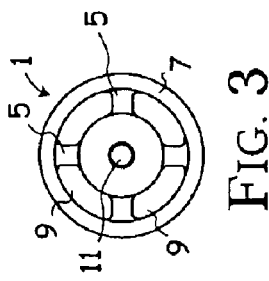

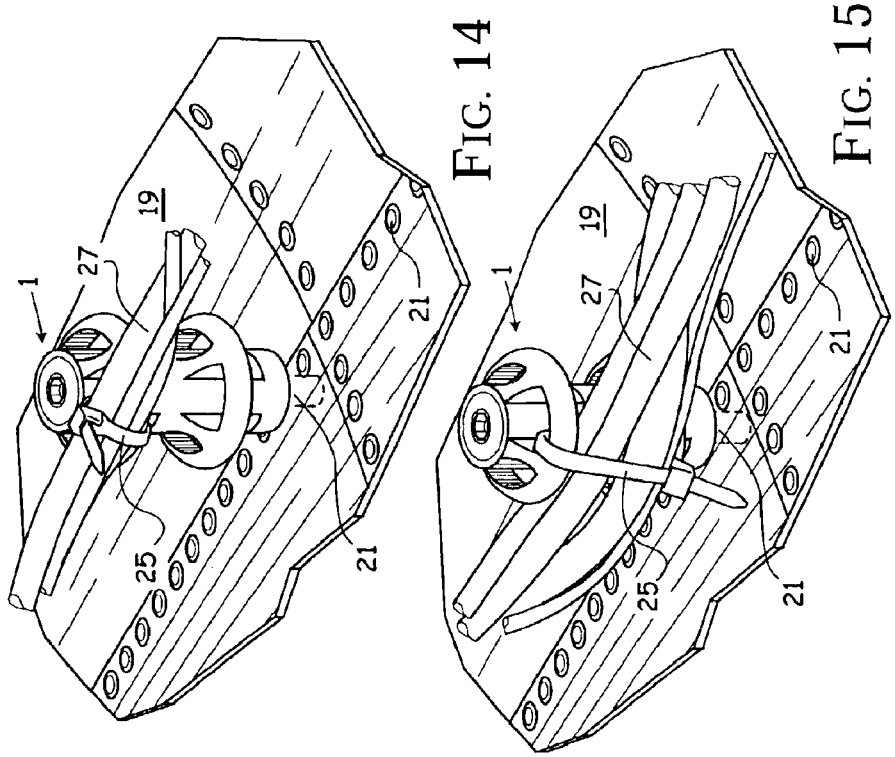
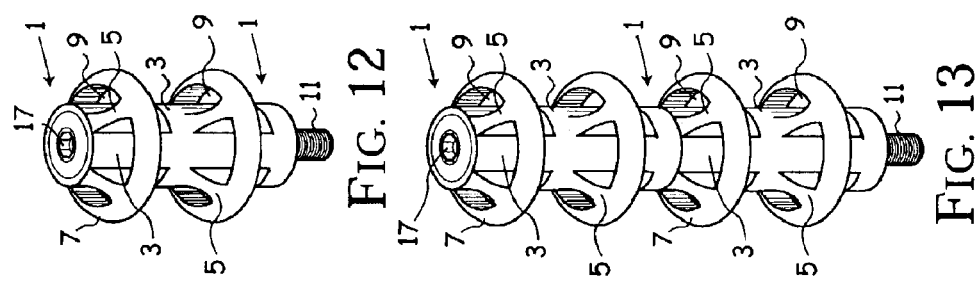
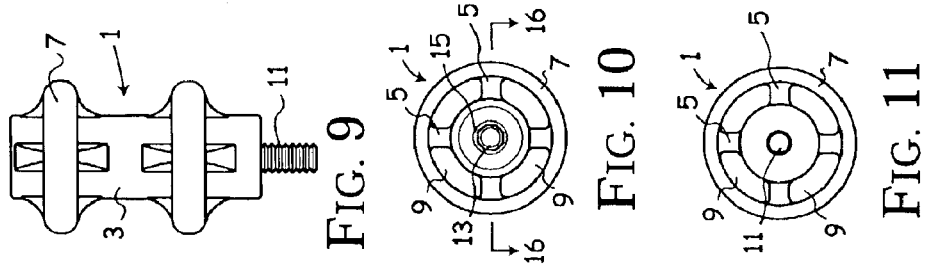

RING-POST FASTENER

RELATED APPLICATIONS

This application is a continuation-in-part of my U.S. Provisional Application Ser. No. 60/400,637, filed Jul. 31, 2002, now abandoned.

BACKGROUND OF THE INVENTION

The present invention relates to mounts and fasteners. More specifically, the present invention relates to mounts and fasteners for bundling and tying elongate objects such as electrical wires, tubes and hoses, and for securing such objects to a support.

Many types of mounting devices have been developed over the years for holding one or more elongate objects to a support. One of the more popular devices for use in vehicles, including automobiles and airplanes, has been the "P" clamp. The P clamp includes a metal strap formed into a generally circular portion with each end of the strap terminating in a flat foot portion. After elongate objects are encircled by the circular portion, the feet are overlapped until apertures in the feet are aligned to receive a threaded fastener. Unfortunately, P clamps suffer from numerous disadvantages. Foremost, P clamps are generally not adjustable so that when they are used in an environment where different sizes of bundles have to be accommodated, a large inventory of different sized P clamps must be maintained. Also, it is difficult to achieve a predetermined tension on the held objects, and thus it is sometimes necessary to use additional fillers to encircle the objects to provide consistent compressive forces. The P clamp has changed very little over the years which is surprising considering the various problems associated with their use. Most assemblers agree that the installation of these clamps is difficult because of their stiffness. Furthermore, the use of commercially available P clamps on electrical cables is complicated by the fact that electrical cable diameter dimensions are not tightly controlled and that cables have "soft" irregular cross-sections which can be damaged by excessive force caused by securing with a P clamp.

Tie straps, also referred to as cable ties, have been widely used for bundling wires, and for securing such wires to a support. The tie strap structure includes a flexible tie for circling a bundle and a buckle at one end of the tie to lock the tie strap structure into a loop. Various mounts have been developed for securing the tie strap and bundle of wires to a support. The mounts include one or more windows or slots for receiving one end of the tie strap which is then looped back upon itself to be attached by the tie strap's buckle. The mounts are then affixed to a support surface by a threaded fastener or adhesive.

Advantageously, tie straps have adjustable diameters to accommodate a wide variety of bundle diameters. Accordingly, such fasteners typically do not require fillers to provide consistent compressive forces upon objects to be bundled. Unfortunately, presently available mounts for tie straps require that both sides of the mount be accessible for entry and exit of the strap. Further, such mounts require the additional component of an adhesive or of a threaded fastener to secure the mount to a support surface, thereby requiring that an additional inventory of components be maintained.

Thus, it would be advantageous to provide an improved fastener and mount construction for bundling and securing elongate objects including electrical wires, tubes or hoses.

It would be additionally advantageous to provide an improved fastener which was lightweight, inexpensive to manufacture, and could be manufactured in one piece.

It would also be advantageous to provide a fastener and mount which provided for an adjustable diameter to accommodate elongate objects of different sizes.

SUMMARY OF THE INVENTION

The present invention addresses the aforementioned disadvantages by providing an improved ring-post fastener for use with a traditional tie strap for bundling and securing elongate objects to a support surface.

The ring-post fastener includes a post having first and second ends which defines the fastener's longitudinal axis. Radially projecting from the post's longitudinal axis are a plurality of spokes. The ring-post fastener of the present invention further includes a ring concentrically aligned with the fastener's post which is affixed in place by the fastener's spokes, in similar manner to a bicycle wheel construction. The separation between spokes creates a plurality of slots with the slot's periphery defined by the fastener's post, spokes and ring. The plurality of slots are sized for receipt and passage of a conventional tie strap.

In a preferred embodiment of the invention, the ring-post fastener of the present invention includes four radially projecting spokes which create four equal sized slots, with each slot sized for receipt of a conventional tie strap. Though the ring-post fastener of the present invention is described herein as including four spokes, the fastener may include more or less spokes depending on the size and use of the fastener without departing from the spirit or scope of the invention.

The ring-post fastener of the present invention further includes a first means for attaching one end of the post to a support surface. This "affixing means" may include any of numerous constructions known to those skilled in the art including adhesives, rivets, hook and pile fasteners, etc. However, preferably the post includes the male threads of a threaded fastener projecting axially from the post's end for affixing the ring-post fastener to a support surface. In particular, a support surface is provided with female threads of a threaded fastener so that the ring-post fastener can be threadably affixed to the support surface by rotatably inserting the male threads projecting axially from the post into the female threads formed in the support surface.

Preferably, the second end of the fastener's post includes a second "affixing means" in the form of female threads which threadably match the male threads provided on the ring-post fastener's other end. By providing male threads and female threads of a threaded fastener on alternate ends of the fastener's post enables multiple fasteners to be stacked for bundling and securing a greater amount and number of elongate objects.

In an additional preferred embodiment, the ring-post fastener of the present invention includes a single post, but a plurality of sets of radially projecting spokes and concentric rings. For example, a preferred embodiment of the ring-post fastener includes a pair of rings, concentrically positioned with respect to the fastener's post, which are maintained in place by first and second sets of spokes. Again, preferably four spokes are provided for affixing and positioning each ring. The rings are displaced axially from one another to permit bundled objects to be attached to the first ring and/or the second ring. Alternatively, bundled objects can be secured between both rings.

In operation, the ring-post fastener of the present invention is affixed to a support surface, such as by rotatably threading the fastener's male threads into mating female threads formed in the support surface. Once torqued in place, objects, such as electrical wires, are bundled with a tie strap and affixed to the fastener's ring by projecting one end of the tie strap through one of the ring-post fastener's slots. Thereafter, the tie strap encircling the bundle is made to form a complete loop with the ends of the tie strap buckled together. Where the bundled objects are large in diameter or possess great mass, the tie strap can be threaded through slots of two or more rings and then made to wrap around the objects to be bundled. If additional objects need to be affixed in place, additional ring-post fasteners are stacked upon the initial ring-post fastener by threading the male threads of the second ring-post fastener into the female threads of a previously secured ring-post fastener.

An advantage of the present invention is that the ring-post fastener permits use of a conventional tie strap having an adjustable diameter.

An additional advantage of the ring-post fastener is that it permits the use of a single mount for bundling and securing elongate objects of various sizes.

Still an additional advantage of the present invention is that the ring-post fastener does not require the use of additional bolts or washers to affix the fastener to a support surface.

Furthermore, the ring-post fastener is inexpensive and simple to manufacture.

Other features and advantages of the present invention will be appreciated by those skilled in the art upon reading the detailed description which follows with reference to the attached drawings.

BRIEF DESCRIPTION OF THE DRAWINGS

FIG. 1 is a side view of a first embodiment of the ring-post fastener of the present invention as seen from the front, back, left or right;

FIG. 2 is a top view of the ring-post fastener of FIG. 1;

FIG. 3 is a bottom view of the ring-post fastener of FIG. 1;

FIG. 4 is a perspective view of the ring-post fastener of FIG. 1;

FIG. 5 is a perspective view of two ring-post fasteners of FIG. 1 in a stacked configuration;

FIG. 6 is a perspective view of the ring-post fastener of FIG. 1 illustrating the invention's use of a tie strap to bundle and secure elongate objects to a support surface.

FIG. 7 is a perspective view of two ring-posts shown in FIG. 1 in a stacked configuration illustrating the invention's use of a tie strap to bundle and secure objects to a support surface;

FIG. 9 is a side view of a second embodiment of the ring-post fastener of the present invention including a pair of concentric rings as seen from the front, back, left or right;

FIG. 10 is a top view of the ring-post fastener of FIG. 9;

FIG. 11 is a bottom view of the ring-post fastener of FIG. 9;

FIG. 12 is a perspective view of the ring-post fastener of FIG. 9;

FIG. 13 is a perspective view of two ring-post fasteners of FIG. 9 in a stacked configuration;

FIG. 14 is a perspective view of the ring-post fastener of FIG. 9 illustrating the invention's use of a tie strap to bundle and secure elongate objects to a support surface.

FIG. 15 is an additional perspective view of the ring-posts shown in FIG. 9 illustrating the invention's use of a tie strap to bundle and secure objects to a support surface.

DETAILED DESCRIPTION OF THE INVENTION

Figure 16:
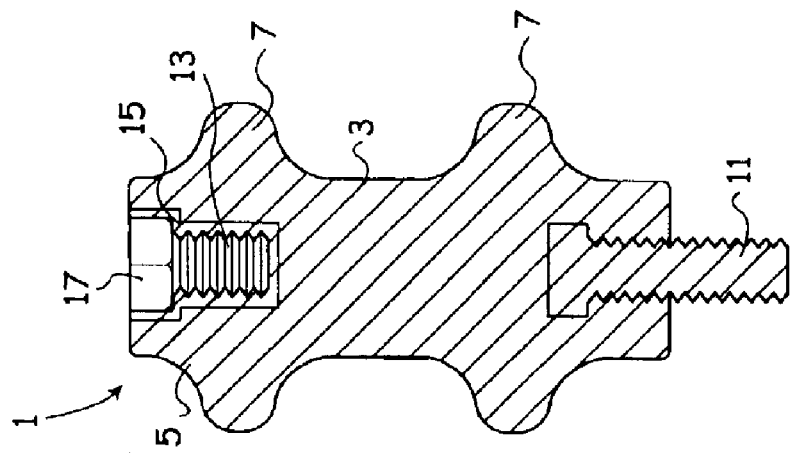
FIG. 16 is a cross-sectional view of the ring-post fastener of FIG. 9.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

With reference to the figures, the ring-post fastener 1 of the present invention includes an axially aligned post 3, radially extending spokes 5 and a ring 7. The ring 7 is positioned concentric with the post's axis and secured in place by the spokes 5 which project radially from the post intermediate the post ends. The spokes are sufficiently thin so as to provide slots 9 between the spokes which are sufficiently large to accept a conventional tie strap 25. Any number of spokes 5 may be provided for practicing the invention. However, preferably four spokes are provided at 90° increments around the post axis.

Figure 8:
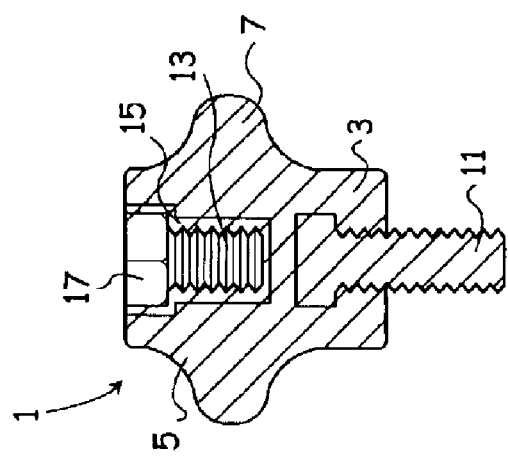
FIG. 8 is a cross-sectional view of the ring-post fastener of FIG. 1.

With reference to FIGS. 6 and 7, the ring-post fastener 1 of the present invention further includes a first means for affixing one end of the post 3 to a support surface 19. The affixing means may take the form of any of numerous constructions known to the art such as adhesives, rivets, hook and pile fasteners, etc. However, as shown in the figures, preferably the first affixing means 11 comprises male threads of a threaded fastener which project axially from one end of the post 3. The ring-post fastener 1 is then affixed to a support surface by rotating the male threads of the first affixing means 11 into female threads 21 formed into or mounted upon the support surface 19. The male threads 11 of the first affixing means may be constructed by machining one end of the post 3 into male threads. Alternatively, as shown in FIGS. 8 and 16, the male threads may comprise a separate component, such as a conventional bolt, which is affixed within the post 13.

In a preferred embodiment of the invention, the ring-post fastener 1 includes a second affixing means 13 located at the end of the post 3 opposite the first affixing means 11. Again, the second affixing means may be constructed in various forms as known by those skilled in the art. However, preferably the second affixing means has a construction which would mate and lock to the first affixing means 11. As shown in the figures, preferably the second affixing means 13 includes female threads which are sized and configured for lockable engagement to the male threads of the first affixing means 11. The female threads of the second affixing means 13 may be formed directly into the second end of the post 3. Alternatively, with reference to FIGS. 8 and 16, an insert 15 is provided which is affixed within one end of the post 3. The insert 15 includes a cavity having female threads 13 formed for receipt of male threads 11.

As shown in FIGS. 5, 7 and 13, by providing engageable first and second affixing means, multiple ring-post fasteners can be stacked upon themselves to provide an extendable post and fastening structure. For example, FIGS. 1–4 illustrate a preferred ring-post fastener of the present invention including a single ring 5 and single set of spokes 5 for affixing the ring in place. As shown in FIGS. 5 and 7, two ring-post fasteners 1 can be stacked and locked upon themselves to provide an extended post having a pair of concentric rings and first and second sets of spokes 5 for positioning such rings. Of course, additional single ring fasteners 1 can be stacked upon themselves to provide an extended post having any number of rings for securing lesser or greater amounts of elongate objects.

With reference to FIGS. 9–16, in still an additional preferred embodiment of the invention, the ring-post fastener 1 includes two or more sets of rings 7 and radially projecting spokes 5 for concentrically positioning such rings. As shown in FIG. 15, a preferred ring-post fastener 1 includes a pair of rings, concentrically positioned with respect to the fastener's post by first and second sets of spokes 5. Again, preferably four spokes are provided within each set of spokes which are sized to provide slots 9 of sufficient size to receive a tie strap 25.

In an additional preferred embodiment of the invention, the ring-post fastener includes a means for gripping and rotating the ring-post fastener for rotatably affixing the fastener to a support surface 19. Various means for gripping the ring-post fastener may be provided as can be determined by those skilled in the art. For example, the post may be provided with a square or other polygonal cross-section for enabling a wrench or pliers to easily grip the post for manual rotation. However, preferably as shown in FIGS. 8 and 16, the ring-post fastener 1 includes a hexagonal recess 17 for receipt of Allen type wrenches.

Figure 18:
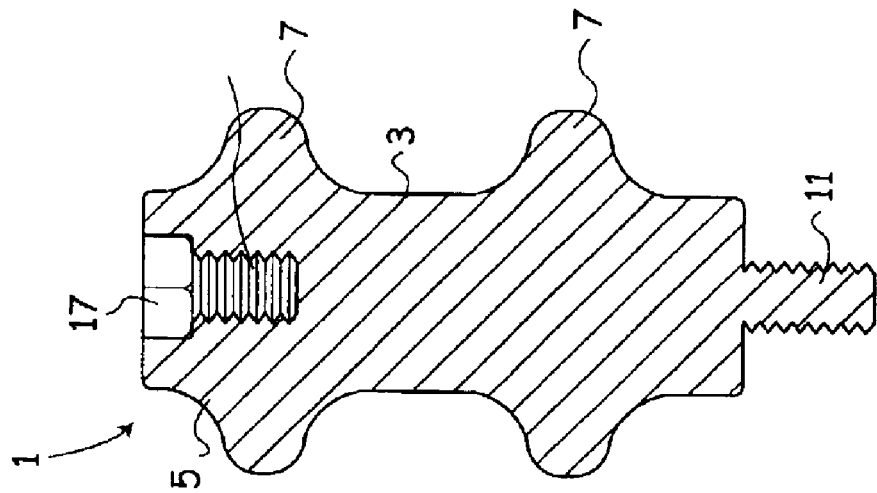
FIG. 18 is a cross-sectional view of a one-piece ring-post fastener including two rings and corresponding spokes.
Figure 17:
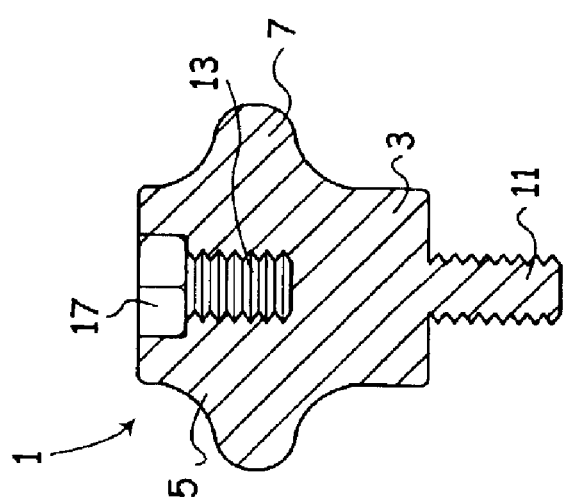
FIG. 17 is a cross-sectional view of a one-piece ring-post fastener including a single ring and corresponding spokes.

With reference to FIGS. 9 and 16, in one embodiment of the invention, the ring post fastener includes a first insert, in the form of a metal bolt or the like, for providing the male threads 11 of the first fastener, and a second insert, in the form of modified nut, for providing the female threads of the second fastener. However, in an additional preferred embodiment of the invention, the ring post fastener 1 is manufactured from one piece of material. With reference to FIGS. 17 and 18, the ring post fastener is molded and/or machined from a single piece of metal or plastic. Suitable metal materials including steel, aluminum, titanium and alloys can be selected by those skilled in the art. Moreover, acceptable plastics include thermoplastics such as ABS, polyvinyl chloride, polyethylene, styrene and nylon, and thermosetting plastics such as polyester and silicone. However, the preferred material for the ring post of the present invention is nylon 6/6 per ASTM D4066.

Where the one piece construction is made of nylon plastic, preferably the ring post is molded by injection molding. The male and female threads may be formed during the molding process. Alternatively, the male threads 11 and female threads 13 may be machined directly into the respective extremities of the post using machining techniques that can be selected by those skilled in the art. The one piece nylon construction provides reduced manufacturing costs and significant savings in weight.

As shown in FIGS. 6, 7, 14, and 15, once the ring-post fasteners have been affixed to a support surface 19, elongate objects 27 are bundled with a tie strap and affixed to the fastener's ring 7 by projecting one end of the tie strap through one of the slots 9 and then looping the tie strap back upon itself to be locked by the tie strap's buckle. Where the elongate objects have a relatively small diameter, the bundled objects are preferably bundled and secured to a single ring, as shown in FIGS. 6 and 7. However, where the bundled objects have a large diameter, it is preferred that the tie strap be threaded through slots of two or more rings when bundling and securing elongate objects. If additional objects need to be secured, additional ring-post fasteners 1 can be stacked and secured to ring-post fasteners previously secured to the support surface 19.

The ring-post fastener of the present invention may have various dimensions as can be determined by those skilled in the art. However, a preferred ring-post fastener includes a post having a length of approximately 1.5 inches and includes a ring having an outer diameter of approximately 0.9 inches. The ring-post fastener may also be constructed of various material as can be determined by those skilled in the art. However, preferred materials for the post, spokes and ring include plastics such as nylon. Where the threaded fasteners are provided in the form of inserts, preferred materials include titanium and/or cadmium plated carbon steel.

While several particular forms of the invention have been illustrated and described, it will be apparent that various modifications can be made without departing from the spirit and scope of the invention. Accordingly, it is not intended that the invention be limited except by the following claims.

I claim:

1. A ring-post cable tie fastener for supporting cables comprising:

an axially aligned post having first and second ends;

a plurality of spokes radially projecting from said post;

a ring concentric with said post;

said spokes engaging and radiating radially inward from said ring to engage said post to form a plurality of hollow slots with the periphery of each of said slots being defined by said post, a pair of adjacent spokes and said ring so that said slots form conduits permitting the passage of a tie strap for supporting a cable to one of said plurality of slots; and a male fastener affixing means for affixing said first end of said post to a support surface;

said ring post including post, spokes, ring, and male affixing means being formed as a one piece construction from a single material.

2. The ring-post fastener of claim 1 wherein said male fastener affixing means includes the male threads of a threaded fastener.

3. The ring-post fastener of claim 1 further comprising a female affixing means for affixing said second end of said post to a support surface, said ring post including post, spokes, ring, male affixing means and female affixing means being formed as a one piece construction from a single material.

4. The ring-post fastener of claim 2 further comprising a female affixing means for affixing said second end of said post to a support surface which includes the female threads of a threaded fastener, said ring post including post, spokes, ring, male affixing means and female affixing means being formed as a one piece construction from a single material.

5. The ring post fastener of claim 1 wherein said ring post fastener is made of plastic.

6. The ring post fastener of claim 4 wherein said ring post fastener is made of plastic.

7. The ring post e of claim 1 wherein separation of said spokes create said plurality of slots, and said ring post fastener further includes a tie strap secured to one of said plurality of slots.

8. A ring-post cable tie fastener for supporting cables comprising:

an axially aligned post having first and second ends;

a plurality of spokes radially projecting from said post;

a ring concentric with said post and affixed to said spokes;

said spokes engaging and radiating radially inward from said ring to engage said post to form a plurality of hollow slots with the periphery of each of said slots being defined by said post, a pair of adjacent spokes and said ring so that said slots form conduits permitting the passage of objects;

male fastener affixing means for affixing said first end of said post to a support surface, said male fastener affixing means include the male threads of a threaded fastener; and female fastener affixing means formed as said second end for affixing said second end of said post to a support surface, said female fastener affixing means include the female threads of a threaded fastener;

said ring post including post, spokes, ring, male affixing means and female affixing means being formed as a one piece construction from a single plastic material.

9. A ring-post cable tie fastener for supporting cables comprising:

an axially aligned post having first and second ends;

a plurality of first spokes radially projecting from said post;

a first ring concentric with said post and affixed to said first spokes;

said first spokes engaging and radiating radially inward from said first ring to engage said past to form a first set of hollow slots with the periphery of each of said slots being defined by said post, a pair of adjacent first spokes and said first ring so that said slots form conduits permitting the passage of a tie strap for supporting a cable to one of said plurality of slots;

a plurality of second spokes radially projecting from said post;

a second ring concentric with said post and affixed to said second spokes;

said second spokes engaging and radiating radially inward from said second ring to engage said post to form a second set of hollow slots with the periphery of each of said slots being defined by said post, a pair of adjacent second spokes and said second ring so that said slots form conduits permitting the passage of a tie strap for supporting a cable to one of said plurality of slots; and male fastener affixing means for affixing said first end of said post to a support surface;

said ring post including post, spokes, first and second rings, and male affixing means being formed as a one piece construction from a single material.

10. The ring-post fastener of claim 9 wherein said male affixing means includes the male threads of a threaded fastener.

11. The ring-post fastener of claim 9 further comprising a female affixing means for affixing said second end of said post to a support surface, said ring post including post, spokes, first and second rings, male affixing means and female affixing means being formed as a one piece construction from a single material.

12. The ring-post fastener of claim 10 further comprising a female affixing means for affixing said second end of said post to a support surface which includes the female threads of a threaded fastener, said ring post including post, spokes, first and second rings, male affixing means and female affixing means being formed as a one piece construction from a single material.

13. The ring post fastener of claim 9 wherein said ring post fastener is made of plastic.

14. The ring post fastener of claim 12 wherein said ring post fastener is made of plastic.

* * * * *